(12) United States Patent
Zhang et al.

(10) Patent No.: US 11,669,632 B2
(45) Date of Patent: Jun. 6, 2023

(54) METHOD AND APPARATUS FOR CONTROL OF DATA ACCESS

(71) Applicant: BEIJING BYTEDANCE NETWORK TECHNOLOGY CO., LTD., Beijing (CN)

(72) Inventors: Jianqing Zhang, Los Angeles, CA (US); Zhengqin Luo, Los Angeles, CA (US); Xingxiu Chen, Beijing (CN); Zhipeng Tian, Culver City, CA (US); Hengming Dai, Culver City, CA (US)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/585,442

(22) Filed: Jan. 26, 2022

(65) Prior Publication Data
US 2023/0145130 A1    May 11, 2023

(30) Foreign Application Priority Data
Nov. 5, 2021 (CN) .......................... 202111306878.4

(51) Int. Cl.
*G06F 21/62* (2013.01)
*G06F 21/60* (2013.01)

(52) U.S. Cl.
CPC .......... *G06F 21/6227* (2013.01); *G06F 21/62* (2013.01); *G06F 21/6245* (2013.01); *G06F 21/60* (2013.01); *G06F 21/6254* (2013.01)

(58) Field of Classification Search
CPC ...... G06F 21/6227; G06F 21/60; G06F 21/62; G06F 21/6245; G06F 21/6254
See application file for complete search history.

(56) References Cited

U.S. PATENT DOCUMENTS

| 7,437,362 B1 | 10/2008 | Ben-Natan |
| 7,774,365 B2 * | 8/2010 | Oxenstierna ........ G06F 21/6218 709/204 |

(Continued)

FOREIGN PATENT DOCUMENTS

| CN | 101453460 A | 6/2009 |
| CN | 104660578 A | 5/2015 |

(Continued)

*Primary Examiner* — Jayesh M Jhaveri (57) ABSTRACT

According to examples of the present disclosure, there is provided a method and device for controlling data access. The method comprises: receiving a data query request characterizing that a first user requests target data; obtaining a business data access capability attribute corresponding to the first user and obtaining a business security attribute corresponding to the target data; wherein the business data access capability attribute is used to characterize capability of accessing data in a business environment in the charge of a user based on a business attribute of the user; determining a data query processing policy corresponding to the data query request by invoking a data access security model based on the business data access capability attribute of the first user and the business security attribute of the target data; and processing the target data by invoking the data query processing policy and generating a response message for feedback.

9 Claims, 3 Drawing Sheets

(56) References Cited

U.S. PATENT DOCUMENTS

| | | | | |
|---|---|---|---|---|
| 8,306,999 B2* | 11/2012 | Gass, III | ............ | G06F 21/6227 |
| | | | | 707/802 |
| 2008/0168135 A1* | 7/2008 | Redlich | ................ | G06F 16/282 |
| | | | | 709/204 |
| 2008/0235231 A1* | 9/2008 | Gass | .................. | G06F 21/6227 |
| | | | | 707/999.102 |
| 2011/0179011 A1* | 7/2011 | Cardno | ............... | G06F 21/6227 |
| | | | | 707/E17.108 |
| 2012/0317129 A1* | 12/2012 | Qayyum | ............. | G06F 16/288 |
| | | | | 707/E17.069 |
| 2015/0294120 A1* | 10/2015 | Allen | ................. | G06F 21/6227 |
| | | | | 726/1 |
| 2018/0025174 A1 | 1/2018 | Mathur et al. | | |
| 2019/0332795 A1* | 10/2019 | Woodward | .......... | G06F 21/6227 |

FOREIGN PATENT DOCUMENTS

| CN | 105357201 A | 2/2016 |
|---|---|---|
| CN | 109117668 A | 1/2019 |

* cited by examiner

METHOD AND APPARATUS FOR CONTROL OF DATA ACCESS

FIELD

Embodiments of the present disclosure relate to the field of computers, and more specifically to a method, apparatus, device and computer storage medium for control of data access.

BACKGROUND

Business data to be maintained for enterprises is very complicated and massive. Due to the complexity of the workflow within the enterprises, the business data to be processed by persons responsible for different business may be the same or different. The data needed to be processed by the persons responsible for the same business in different time periods may be different. At present, access to data by the responsible persons is mostly handled in a static single manner, which cannot adapt to the needs for actual business. Hence, more flexible, safer and more controllable control of data access is needed.

SUMMARY

In a first aspect of the present disclosure, there is provided a method for control of data access. The method comprises: receiving a data query request characterizing that a first user requests target data; obtaining business data access capability attribute corresponding to the first user and obtaining a business security attribute corresponding to the target data; wherein the business data access capability attribute is used to characterize capability of accessing data in a business environment in the charge of a user based on a business attribute of the user; and the business security attribute is used to characterize an identification attribute for classifying data based on business security requirements; determining a data query processing policy corresponding to the data query request by invoking a data access security model based on the business data access capability attribute of the first user and the business security attribute of the target data; and processing the target data by invoking the data query processing policy and generating a response message for feedback.

In a second aspect of the present disclosure, there is provided an apparatus for control of data access. The apparatus comprises: a receiving unit configured to receive a data query request characterizing that a first user requests target data; an obtaining unit configured to obtain business data access capability attribute corresponding to the first user and obtain a business security attribute corresponding to the target data; wherein the business data access capability attribute is used to characterize capability of accessing data in a business environment in the charge of a user based on a business attribute of the user; and the business security attribute is used to characterize an identification attribute for classifying data based on business security requirements; a determining unit configured to determine a data query processing policy corresponding to the data query request by invoking a data access security model based on the business data access capability attribute of the first user and the business security attribute of the target data; and a response unit configured to process the target data by invoking the data query processing policy and generate a response message for feedback.

In a third aspect of the present disclosure, there is provided an electronic device. The electronic device comprises: a memory and a processor; wherein the memory is used to store one or more computer instructions which are executed by the processor to implement the method according to the first aspect of the present disclosure.

In a fourth aspect of the present disclosure, there is provided a computer readable storage medium in which is stored one or more computer instructions which are executed by a processor to implement the method according to the first aspect of the present disclosure.

In a fifth aspect of the present disclosure, there is provided a computer program product comprising one or more computer instructions which are executed by a processor to implement the method according to the first aspect of the present disclosure.

BRIEF DESCRIPTION OF THE DRAWINGS

In conjunction with the accompanying drawings and with reference to the following detailed description, the above and other features, advantages, and aspects of embodiments of the subject matter described herein will become more apparent. In the figures, identical or like reference numbers denote identical or like elements, wherein.

DETAILED DESCRIPTION OF EMBODIMENTS

Hereinafter, embodiments of the subject matter described herein will be described in more detail with reference to the accompanying drawings. Although some embodiments of the subject matter described herein are illustrated in the drawings, it is to be understood that the subject matter described herein may be implemented through various forms, but may not be interpreted as being limited to the embodiments illustrated herein. On the contrary, these embodiments are only intended to understand the subject matter described herein more thoroughly and completely. It is to be understood that the accompanying drawings and embodiments of the subject matter described herein are only for the purpose of illustration, without suggesting any limitation of the protection scope of the subject matter described herein.

As used herein, the terms "comprises" or like terms should be understood as open-ended terms that mean "comprises, but is not limited to." The term "based on" is to be read as "based at least in part on." The term "one example embodiment" and "the example embodiment" are to be read as "at least one example embodiment." The terms "first," "second," and the like may refer to different or same objects. Other definitions, explicit and implicit, may be comprised below.

As stated above, the person in charge of the business needs to access business data according to business needs. For example, operation and maintenance personnel or developers may access business data to develop and maintain applications. Customer service personnel may access business data to solve problems of a user. However, depending on the specific business, the access to the business data by the person in charge of the business needs to be controlled more flexibly and securely. For example, it is necessary to prevent the person in charge of the business from accessing user data that has nothing to do with his business, thereby better protecting user data.

Example embodiments of the present disclosure propose a method for control of data access. The method comprises: receiving a data query request characterizing that a first user requests target data; obtaining business data access capability attribute corresponding to the first user and obtaining a business security attribute corresponding to the target data; determining a data query processing policy corresponding to the data query request by invoking a data access security model based on the business data access capability attribute of the first user and the business security attribute of the target data; and processing the target data by invoking the data query processing policy and generating a response message for feedback.

In this way, the access to data by the user may be effectively controlled by providing a response to the request based on business data access capability attribute of the user and the business security attribute of the target data. For example, the access to the business data by the person in charge of the business may be controlled effectively.

Hereinafter, embodiments of the present disclosure will be described in detail with reference to the drawings.

Figure 1:
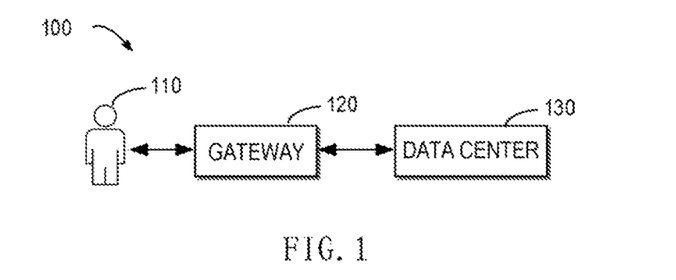
FIG. 1 illustrates a schematic diagram of an example environment in which some embodiments of the present disclosure can be implemented.

FIG. 1 shows a schematic diagram of an example environment 100 in which some embodiments of the present disclosure are implemented. As shown in FIG. 1, in the environment 100, an initiator 110 of a request (hereinafter also referred to as the initiator) may send a request to a gateway 120 to query for business data from a data center 130. The initiator 110 of the request may be an internal employee of the enterprise, such as the person in charge of the business. Depending on the specific business, the initiator 110 of the request may be an operator, such as customer service personnel who works directly for the customer. The initiator 110 of the request may also be a product development or operation and maintenance personnel, such as a software developer.

The data center 130 is used to store business data. The business data may comprise user data of the products of the enterprise. User data may comprise data of users as natural persons. User data may also comprise user data of entities other than natural persons. For example, user data may comprise user data of an enterprise, user data of an institution, and so on. Alternatively or additionally, the business data may further comprise other data related to the business, such as the source code of the software products.

The data center 130 may be located in the same country geographically as the initiator 110 of the request. The data center 130 may also be located geographically in different countries from the initiator 110 of the request. For example, the initiator 100 of the request may be an operation and maintenance personnel at the headquarter of a multinational enterprise. The data center 130 may be a data center of a subsidiary of a multinational enterprise located in another country, and the data center stores user data of the country.

The communication between the initiator 100 of the request and the data center 130 may be implemented by means of the gateway 120. The gateway 120 may receive the request of the initiator 110 and forward the request to the data center 130. The gateway 120 may receive a query result returned from the data center 130 and forward the query result to the initiator 110 of the request as a response to the request.

The gateway 120 may also process the received request and query result. For example, the gateway 120 may verify a security credential of the initiator 110 of the request and obtain some information of the initiator 110, such as the office location of the employee. The gateway 120 may further identify the initiator 110 of the request based on the received request. The gateway 120 may further determine whether to forward the request to the data center 130 based on the identification of the initiator 110 of the request. The gateway 120 may further modify the query result received from the data center 130 and provide the modified query result to the initiator 110 of the request.

It should be appreciated that the gateway 120 is only illustrative. For example, some embodiments of the present disclosure may be implemented in a scenario of direct query to a database. In this scenario, part of the functions of the gateway 120 may be implemented by a management or control module of the data center 130.

Hereinafter, the principles and details of control of data access will be described in detail with reference to FIG. 2 to FIG. 4.

Figure 2:
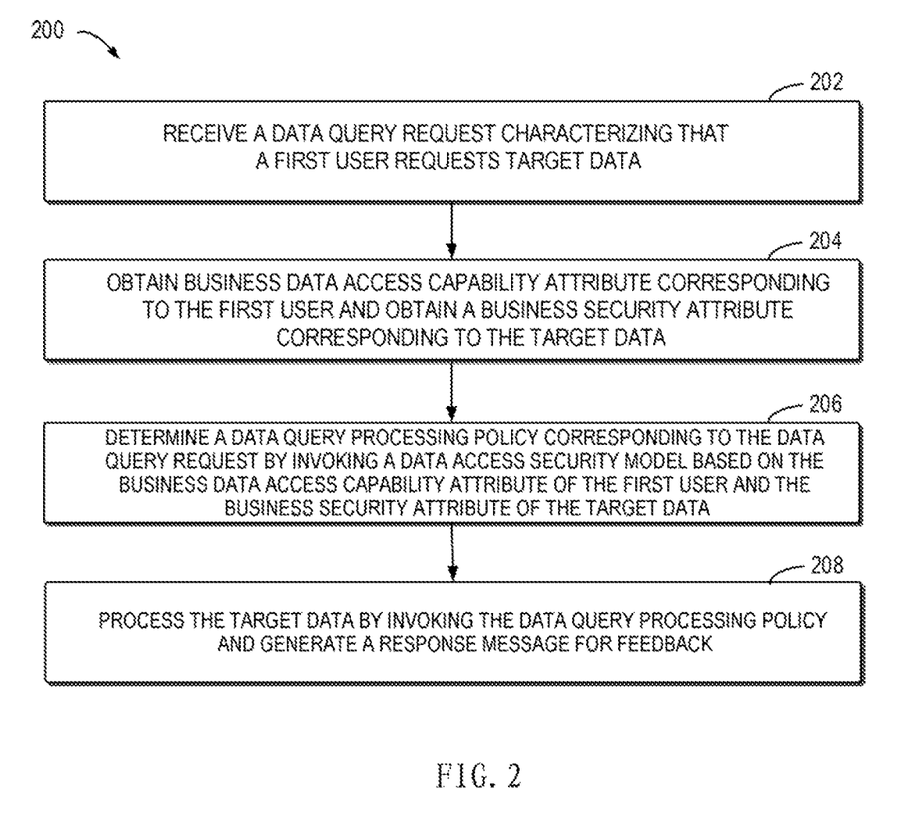
FIG. 2 illustrates a flowchart of a method for control of data access according to some embodiments of the present disclosure.

FIG. 2 illustrates a flowchart of an example method 200 for control of data access according to some embodiments of the present disclosure. The method 200 for example may be implemented at the gateway 120 in FIG. 1.

At block 202, a data query request is received, where the data query request is used to characterize that a first user requests target data. The first user may be a person in charge of the business, such as operation and maintenance personnel, customer service personnel, and so on. In the following, the first user and the initiator 100 of the request may be used interchangeably. The target data may be data related to the business, such as user data related to the business From the perspective of business data security levels, business data may be classified into public data, non-public data, identifiable data, unidentifiable data, temporary data, permanent data, and the like The public data generally refers to data that is specified in the business and allowed to be public, or data that is specified by the user and allowed to be public. For example, for common social software, the information of the user, such as user name, nickname and personalized signature are usually set to be public data. Alternatively or additionally, the public data may comprise data that can be obtained from channels other than the data center 130. Anyone may obtain these public data without querying the data center 130.

On the contrary, the non-public data generally refers to data that is specified by the business and not allowed to be public, or data that is specified by the user and not allowed to be public. For example, for an e-commerce platform, user address information is generally public by the user. This type of data is only to meet the needs of business such as an order, and this type of data may generally be defined as non-public data.

To meet the needs for business, the data center 130 may store non-public data. The data center 130 may provide employees with non-public data for implementing the functions of the product. For example, the data center 130 may store the real name and phone number of the user for authentication when the user logs in.

The identifiable data may refer to data that can identify or locate a natural person, entity, or account. The identifiable data may comprise personally identifiable information (PII). Examples of the identifiable data may comprise personal names or user names, user identifiers, business names, stock codes, and so on. The identifiable data may further comprise data that can effectively narrow the scope of identification, such as a birthday. Although the birthday cannot uniquely identify a natural person, it may greatly narrow the scope of identification.

The identifiable data may comprise an identifier. The identifier may uniquely identify a natural person, entity or account. The identifier may be a combination of a letter, a number, and a symbol. Examples of the identifier may comprise user identifiers (uid), and personal identity card numbers. In Internet products, user data may be uniquely associated with the uid.

The unidentifiable data may refer to data that cannot identify or locate a natural person, entity or account, for example, the amount of browsing, praising or commenting of videos of the user.

The temporary data may refer to data that is only valid for a limited time period or under certain conditions, for example, temporary links, login passwords, and the like The temporary data may comprise user data whose association with the user will become invalid beyond a threshold time period, such as temporary uid. In some implementations, a temporary uid may be allocated to the user so that an operation and maintenance personnel may use the the temporary uid to query user data. In this way, the operation and maintenance personnel can only query the user data of the user within a predetermined time period. When the temporary uid becomes invalid, the operation and maintenance personnel can no longer query the user data of the user.

On the contrary, the permanent data may refer to data that is still valid beyond a predetermined time period. The permanent data may comprise user data whose association with the user does not become invalid beyond a threshold time period. Examples of the permanent data may comprise the permanent uid of the user. For example, all user data since the account was created may be uniquely associated with the uid, and the uid remains valid until the account is unregistered.

It should be appreciated that the classification and definition of the business data may vary depending on actual applications. For example, in some implementations, the uid of the user may be displayed as public data on the personal page of the user together with the user name. In some other implementations, the uid of the user is stored as non-public data in the data center 130 and thus cannot be publicly accessed.

At block 204, business data access capability attribute corresponding to the first user is obtained and a business security attribute corresponding to the target data is obtained. The business data access capability attribute is used to characterize capability of accessing data in a business environment in the charge of a user based on a business attribute of the user. The business data access capability attribute may indicate whether the access to data by the initiator 110 is limited or indicate a level at which the access is limited.

The corresponding business data access capability attribute of the initiator 110 of the request may be determined based on the related information of the request. If the initiator 110 of the request is determined to be an employee whose access to the data center 130 is limited, the gateway 120 may not directly forward the request to the data center 130 but first analyze the request.

The determination of the business data access capability attribute of the initiator 100 of the request depends on the specific business scenario. In some implementations, the gateway 120 may determine the business data access capability attribute of the initiator 100 of the request based on the business type. For example, since the service of the customer service personnel requires direct communication with the user, the gateway 120 may identify the customer service personnel works directly for the customer as the initiator 110 whose access is not limited. For another example, since the business of the developer of the product does not need to know the real user information, the gateway 120 may identify the developer of the product as the initiator 110 whose access is limited.

Alternatively or additionally, the gateway 120 may determine the business data access capability attribute of the initiator 100 of the request based on geographic factors. For example, the gateway 120 may determine whether the access to the data center 130 by the initiator 100 of the request is limited based on the initiator 110's nationality and geographic location, and a geographic location of the data center 130. For example, due to requirements for data sovereignty protection, the gateway 120 may identify an employee who is not geographically in the same country as the data center 130 as a limited initiator 110.

Alternatively or in addition, the gateway 120 may determine the business data access capability attribute of the initiator 110 of the request based on a manager of the data center 130. For example, the gateway 120 may identify an employee who does not belong to the same country as the manager of the data center 130 as the initiator 110 whose access is limited. The manager of the data center 130 may be determined according to data security and privacy compliance requirements of the country or region where the data center 130 is located.

The business security attribute is used to characterize an identification attribute for classifying data based on business security requirements. The business security attributes may comprise or indicate one or more of a public level, an identifiability level, and a time level of the data. In some implementations, if the initiator 100 of the request is determined to be an employee whose access to the data center 130 is limited, the gateway 120 may determine the business security attribute of the requested target data.

In some implementations, the gateway 120 may determine the business security attribute of the target data based on the public level of the target data. As described above, the public level may indicate a degree of difficulty in obtaining the target data from a channel other than the data center 130. For example, the public level of public data may be higher than the public level of non-public data.

Alternatively or additionally, the gateway 120 may determine the business security attribute of the target data based on the identifiability level of the target data. The identifiability level may indicate whether the target data can identify a user, a natural person, or an entity. For example, the identifiability level of identifiable data may be higher than that of the unidentifiable data.

Alternatively or additionally, the gateway 120 may determine the business security attribute of the target data based on the time level of the target data. The time level may indicate whether the association between the user data and the user will become invalid within a threshold time period. For example, the time level of permanent data may be higher than that of the temporary data.

In some implementations, the target data may be classified based on the public level, the identifiability level and the time level. The business security attribute of the target data may be determined based on the classification. The business security attribute may comprise a result of the classification.

For example, the business security attribute of target data with public level exceeding a threshold and with identifiability level exceeding a threshold may be determined to be public and identifiable. Similarly, the business security attribute of target data with public level exceeding the threshold and with identifiability level lower than the threshold may be determined to be public and unidentifiable.

The business security attribute of target data with public level lower than the threshold and with identifiability level exceeding the threshold may be determined to be non-public and identifiable. The business security attribute of target data with public level lower than the threshold and with identifiability level lower than the threshold may be determined to be non-public and unidentifiable. The business security attribute of target data with public level exceeding the threshold, and with identifiability level exceeding the threshold, and with time level exceeding the threshold may also be determined as public, identifiable, and permanent.

At block 206, a data access security model is invoked to determine a data query processing policy corresponding to the data query request based on the business data access capability attribute of the first user and the business security attribute of the target data. The gateway 120 may use the data access security model to determine different data query processing policies.

In some implementations, the data query request comprises a user identification of the first user and a keyword for querying the target data (hereinafter also referred to as a query keyword). The data access security model may determine the corresponding data query processing policy based on the business data access capability attribute of the first user and the business security attribute of the target data. The data query processing policy may comprise a anonymization policy, a data passthrough policy, a data isolation policy, and the like The anonymization policy is used to perform anonymization processing on part or all of the target data. The data passthrough policy is used for direct exchange of the target data. The data isolation policy is used to isolate the target data, that is, to prohibit access to the target data.

In some implementations, when the business data access capability attribute of the first user identifies that the first user is of a type of limited data access right, the query keyword is authorized public information of the second user (hereinafter also referred to as the target user) and the business security attribute of the target data identifies that the target data is non-public, the data access security model may determine that the data query processing policy is the data isolation policy, that is, the first user is prohibited from querying the target data. For example, the initiator 110 may be prevented from using the username of the target user to query the un-public browsing history of the target user. In this way, user data may be protected better.

In some implementations, the data access security model may determine the data query processing policy based on a query rule between the query keyword and target data. The query rule may specify a specific type of target data or target data that may be queried by a specific query keyword. The query rules may be set according to needs in business.

In some implementations, the query keyword and target data may be associated with the same user. In other words, the initiator 110 uses the first user data of a user A as a query keyword to query the second user data of the user A. For example, the initiator 110 uses the username of the user A to query the browsing history of the user A.

In this implementation, the data access security model may determine the data query processing policy based on the business security attributes of the query keyword and the business security attribute of the target data. For example, when the business security attribute of the query keyword and the business security attribute of the target data are both public, the data query processing policy may be determined to be a data passthrough policy. In this way, cross-check between public data may be implemented.

At block 208, the data query processing policy is invoked to process the target data and generate a response message for feedback. The details of the control of data access of different policies will be described in detail below.

In some implementations, the data query policy may be invoked to process the target data and generate a response message, and an effective time is configured for specified data in the target data included in the response message and the response message is fed back. The effective time is used to indicate a validity period for use of the specified data in business. For example, a validity period for use may be configured for a password obtained by the query, so that the initiator 110 can only use the password obtained by the query during the validity period for use, so that the protection of the target data may be implemented.

In some implementations, in response to the data query processing policy being the data passthrough policy, a response message may be generated for feedback based on the target data, and the response message includes the target data. For example, the gateway 120 may forward the request to the data center 130; receive from the data center 130 the queried target data; and send the response including the target data to the initiator 110.

In some implementations, when the business security attribute of the target data is public and the business security attribute of the query keyword for querying the target data in the request is public, the data access security model may determine that the data query processing policy is the data passthrough policy. In this case, the gateway 120 may send the response including the target data to the initiator 110.

Alternatively or additionally, when the business security attribute of the target data is non-public and temporary, and the business security attribute of the query keyword is non-public and unidentifiable, the data access security model may determine that the data query processing policy is the data passthrough policy. In this case, the gateway 120 may send a response including the target data to the initiator 110. For example, the initiator 110 may use the search history of the user as the query keyword to query the data center 130 for the temporary uid of the user. In this way, the initiator 110 may quickly locate the user uniquely associated with the temporary uid to solve problems related to the user. At the same time, since the temporary uid other than the permanent uid is used, the initiator 110 cannot locate any user using the temporary uid after a threshold time period. In this way, user data may be protected while allowing an internal employee to quickly deal with the issue.

Alternatively or additionally, when the business security attribute of the target data is non-public and temporary, and the business security attribute of the query keyword is non-public and temporary, the data access security model may determine that the data query processing policy is the data passthrough policy. In this case, the gateway 120 may send the response including the target data to the initiator 110. For example, the initiator 110 may use the first temporary uid as the query keyword to query the data center 130 for the user's second temporary uid.

The first temporary uid and the second temporary uid may be temporary identifiers allocated to the user according to different business needs. The first temporary uid may be a unique identifier associated with an operation business, and the second temporary uid may be a unique identifier associated with a product development and maintenance business. There is a corresponding mapping relationship between the first temporary uid, the second temporary uid, and the permanent uid. For example, when the customer service personnel reports a issue related to the user to the engineering team, what the engineering team receives is not the permanent uid but the first temporary uid of the user. The engineering team may use the first temporary uid to query the data center 130 for the second temporary uid associated with the product development and maintenance business. The engineering team may use the second temporary uid to locate the issue related to the user and thereby solve the issue.

Alternatively or additionally, when the business security attribute of the query keyword is non-public and temporary and the business security attribute of the target data is non-public and unidentifiable, the data access security model may determine that the data query processing policy is the data passthrough policy. In this case, the gateway 120 may send the response including the target data to the initiator 110. For example, the initiator 110 may use the aforementioned first temporary uid as a query keyword to query the data center 130 for non-public and unidentifiable user data related to the issue of the user, such as the recharge record of the user.

In this way, by enabling the customer service personnel and product development and maintenance personnel to use temporary uids to handle the corresponding business, it is possible to prevent the internal employee from locating the issue of the user to a real user or natural person. In addition, the customer service personnel and product development and maintenance personnel cannot use temporary uids to track behavior data of the user, so that the user data can be protected better.

In some implementations, it is possible to, in response to the data query processing policy being the anonymization policy, perform anonymization processing on the data to be protected in the target data, and generate a response message for feedback based on the target data processed with the anonymization processing. The data to be protected in the target data may be part or all of the target data.

For example, the gateway 120 may forward the request to the data center 130; receive from the data center 130 the target data obtained from the query; anonymize the target data to generate anonymous data, where the identifiability level of the anonymous data is lower than the identifiability level of the target data; send a response including anonymous data to the initiator 110.

Any suitable method may be used to perform anonymization processing on the target data. For example, a statistical technique, a cryptographic technique, a suppression technique, a pseudonymization technique, a generalization technique, a replacement technique and a randomization technique and the like may be used to generate the anonymous data. It should be appreciated that, depending on a specific definition manner, anonymization processing may also be referred to as de-identification processing, pseudonymization processing, and the like. The anonymous data generated by anonymization may be restored. Alternatively, the anonymous data may not be restored.

When the business security attribute of the target data is non-public and identifiable, the gateway 120 may perform anonymization processing on the target data to reduce the identifiability level of the target data. In this way, the initiator 110 cannot obtain non-public identifiable data, thereby realizing the protection of the target data.

For example, when the initiator 110 uses the non-public and unidentifiable data, such as search history, to query for the corresponding real name of the user, the gateway 120 may perform anonymization processing on the real name. Otherwise, the initiator 110 may associate the behavior of the user with the natural person corresponding to the user.

Alternatively or additionally, when the business security attribute of the target data is non-public and the business security attribute of the query keyword is public, the gateway 120 may perform anonymization processing on the target data to reduce the identifiability level of the target data. In this way, the limited initiator 110 cannot use the public data as the query keyword to obtain non-public data, thereby achieving the control of the access to the target data.

For example, when the initiator 110 uses public data, such as a user name, to query for the corresponding real name of the user, the gateway 120 may perform anonymization processing on the real name of the user. Otherwise, the initiator 110 may associate the user with a natural person.

Alternatively or additionally, when the business security attribute of the target data is public and the business security attribute of the query keyword is non-public and unidentifiable, the gateway 120 may perform anonymization processing on the target data to reduce the identifiability level of the target data. In this way, the initiator 110 may be prevented from tracking the account by associating the behavior data of the user with the account.

For example, when the initiator 110 uses the non-public and unidentifiable data, such as search history, to query the corresponding user name, the gateway 120 may perform anonymization processing on the user name. Otherwise, the initiator 110 may associate the behavior of the user with the user.

Alternatively or additionally, when the business security attribute of the target data is public and the business security attribute of the query keyword is non-public, temporary and identifiable, the gateway 120 may perform anonymization processing on the target data to reduce the identifiability level of the target data. In this way, the initiator 110 may be prevented from combining the temporarily identifiable data with public data to realize the positioning of the user, account, or entity.

For example, when the initiator 110 uses the temporary uid to query for the corresponding username, the gateway 120 may perform anonymization processing on the username. Otherwise, the initiator 110 may associate the temporary uid with the user, so that the data associated with the temporary uid may be located to the user.

In some implementations, it is possible to, in response to the data query processing policy being the data isolation policy, generate a response message for feedback, the response message being used to characterize that the data query request fails to be allowed. For example, the gateway 120 may send to the initiator 110 of the request a response indicating that the request is not approved.

In some implementations, since the anonymous data may cause ambiguity in program semantics, the gateway 120 may send to the initiator 110 of the request a response indicating that the request is not approved, instead of sending the anonymous data to the initiator 110.

For example, when the business security attribute of the query keyword is public and identifiable but the business security attribute of the target data is non-public, the gateway 120 may send to the initiator 110 of the request a response indicating that the request is not approved, instead of sending the anonymous data to the initiator 110.

Alternatively or additionally, when the business security attribute of the query keyword is public and unidentifiable but the business security attribute of the target data is non-public and unidentifiable, the gateway 120 may send to the initiator 110 of the request a response indicating that the request is not approved, instead of sending the anonymous data to the initiator 110.

Alternatively or in addition, when the business security attribute of the query keyword is public and unidentifiable, but the business security attribute of the target data is non-public, temporary and identifiable, the gateway 120 may send to the initiator 110 of the request a response indicating that the request is not approved, instead of sending the anonymous data to the initiator 110.

Alternatively or additionally, when the business security attribute of the query keyword is non-public and unidentifiable but the business security attribute of the target data is public and unidentifiable, the gateway 120 may send to the initiator 110 of the request a response indicating that the request is not approved, instead of sending the anonymous data to the initiator 110.

Alternatively or additionally, when the business security attribute of the query keyword is non-public and unidentifiable but the business security attribute of the target data is public and the target data is a permanent identifier, the gateway 120 may send to the initiator 110 of the request a response indicating that the request is not approved, instead of sending the anonymous data to the initiator 110.

Alternatively or additionally, when the business security attribute of the query keyword is non-public, and the query keyword is a temporary identifier, and the business security attribute of the target data is public and unidentifiable, the gateway 120 may send to the initiator 110 of the request a response indicating that the request is not approved, instead of sending the anonymous data to the initiator 110.

Alternatively or additionally, when the business security attribute of the query keyword is non-public and the query keyword is a temporary identifier, and the business security attribute of the target data is public and the target data is a permanent identifier, the gateway 120 may send to the initiator 110 of the request a response indicating that the request is not approved, instead of sending the anonymous data to the initiator 110.

Additionally, when the service security attribute of the query keyword is non-public and identifiable, the gateway 120 may directly send to the initiator 110 of the request a response indicating that the request is not approved, without forwarding the request to the data center 130. In this way, the initiator 110 may be prevented from performing a query by using non-public and identifiable user data obtained from other channels.

The principle and details of the control of data access are described in detail above with reference to FIG. 2. It should be appreciated that the above query rule between the query keyword and target data is only exemplary, and the query rule may also vary depending on specific business.

The embodiments of the present disclosure further provide a corresponding apparatus for implementing the above-mentioned method or process. FIG. 3 illustrates an illustrative structure block diagram of an apparatus 300 for control of data access according to some embodiments of the present disclosure.

Figure 3:
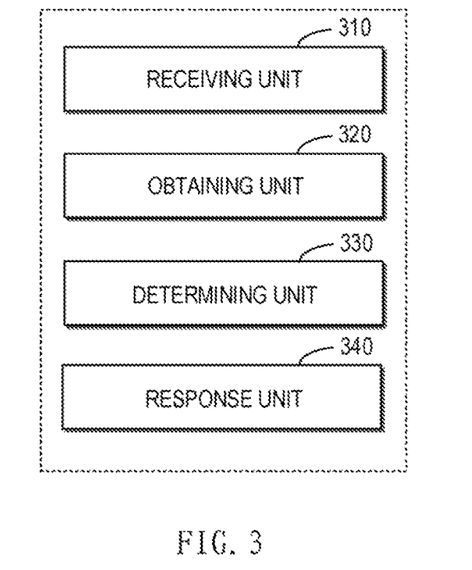
FIG. 3 illustrates an example block diagram of an apparatus for control of data access according to some embodiments of the present disclosure.

As shown in FIG. 3, the apparatus 300 comprises: a receiving unit 310, configured to receive a data query request characterizing that a first user requests target data; an obtaining unit 320 configured to obtain business data access capability attribute corresponding to the first user and obtain a business security attribute corresponding to the target data; wherein the business data access capability attribute is used to characterize capability of accessing data in a business environment in the charge of a user based on a business attribute of the user; and the business security attribute is used to characterize an identification attribute for classifying data based on business security requirements; a determining unit 330 configured to determine a data query processing policy corresponding to the data query request by invoking a data access security model based on the business data access capability attribute of the first user and the business security attribute of the target data; and a response unit 340 configured to process the target data by invoking the data query processing policy and generate a response message for feedback.

In some implementations, the response unit 340 is configured to: when the data query processing policy corresponding to the data query request is an anonymization policy, perform anonymization processing on data to be protected in the target data, and generate a response message for feedback based on the target data processed with the anonymization processing.

In some implementations, the response unit 340 is configured to generate a response message including the target data for feedback based on the target data when the data query processing policy corresponding to the data query request is a data passthrough policy, the response message including the target data.

In some implementations, the response unit 340 is configured to generate a response message characterizing that the data query request is not allowed for feedback when the data query processing policy corresponding to the data query request is a data isolation policy.

In some implementations, the data query request comprises a user identification of the first user and a keyword for querying the target data, and the determining unit 330 is configured to: when the business data access capability attribute of the first user identifies that the first user is of a type of limited data access right, the keyword for querying the target data is authorized public information of the second user and the business security attribute of the target data identifies that the target data is non-public, invoke the data access security model to determine that the data query processing policy corresponding to the data query request is a data isolation policy, where the data isolation policy is used to prevent the first user from querying the target data.

In some implementations, the response unit 340 is configured to: process the target data by invoking the data query policy and generate a response message, and configure an effective time for specified data in the target data included in the response message and feeding back the response message, where the effective time being is to indicate a validity period for use of the specified data in business.

Figure 4:
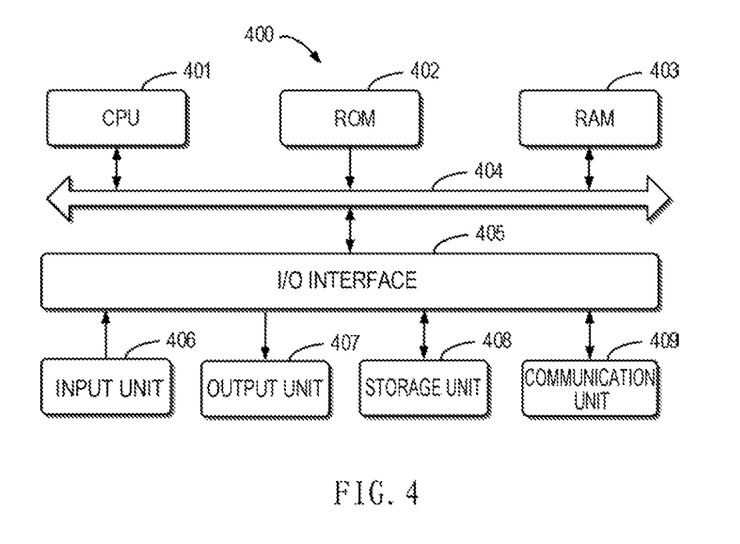
FIG. 4 illustrates a block diagram of an example device that can be used to implement embodiments of the present disclosure.

FIG. 4 illustrates an illustrative block diagram of an example device 400 that can be used to implement embodiments of the present disclosure. For example, the gateway 120 according to embodiments of the present disclosure may be implemented by the device 400. As shown in FIG. 4, the device 400 comprises a central processing unit (CPU) 401 that may perform various appropriate actions and processing based on computer program instructions stored in a read-only memory (ROM) 402 or computer program instructions loaded from a storage unit 408 to a random access memory (RAM) 403. In the RAM 403, there further store various programs and data needed for operations of the device 400. The CPU 401, ROM 402 and RAM 403 are connected to each other via a bus 404. An input/output (I/O) interface 405 is also connected to the bus 404.

Various components in the device 400 are connected to the I/O interface 405, including: an input unit 406 such as a keyboard, a mouse and the like; an output unit 407 including various kinds of displays and a loudspeaker, and the like; a storage page 408 including a magnetic disk, an optical disk, and and the like; a communication unit 409 including a network card, a modem, and a wireless communication transceiver, and the like The communication unit 409 allows the device 400 to exchange information/data with other devices through a computer network such as the Internet and/or various kinds of telecommunications networks.

Various processes and processing described above, e.g., the method 200 may be executed by the processing unit 401. For example, in some embodiments, the method 200 may be implemented as a computer software program that is tangibly included in a machine readable medium, e.g., the storage page 408. In some embodiments, part or all of the computer program may be loaded and/or mounted onto the device 400 via ROM 402 and/or communication unit 409. When the computer program is loaded to the RAM 403 and executed by the CPU 401, one or more acts of the method 200 as described above may be executed.

The present disclosure may be a method, apparatus, system and/or computer program product. The computer program product may include a computer readable storage medium on which computer readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for control of data access, characterized in that the method comprises:
    receiving a data query request characterizing that a first user requests target data using a query keyword;
    obtaining a business data access capability attribute corresponding to the first user and obtaining a first business security attribute corresponding to the target data and a second business security attribute corresponding to the query keyword,
        wherein the business data access capability attribute is used to characterize capability of accessing data in a business environment in the charge of a user based on a business attribute of the user, and
        each of the first business security attribute and the second business security attribute is used to characterize an identification attribute for classifying data based on business security requirements, and comprises one or more of a public level, an identifiability level, and a time level of data, and wherein the public level indicates a degree of difficulty in obtaining the data, the identifiability level indicates whether the data can identify a user, a natural person, or an entity, and the time level indicates whether the association between user data and a user will become invalid within a threshold time period;
    determining a data query processing policy corresponding to the data query request by invoking a data access security model based on the business data access capability attribute of the first user, the first business security attribute of the target data and the second business security attribute of the query keyword; and
    processing the target data by invoking the data query processing policy and generating a response message for feedback.

2. The method of claim 1, characterized in that processing the target data by invoking the data query processing policy and generating a response message for feedback comprises:
    when the data query processing policy corresponding to the data query request is an anonymization policy, performing anonymization processing on data to be protected in the target data, and generating a response message for feedback based on the target data processed with the anonymization processing.

3. The method of claim 1, characterized in that processing the target data by invoking the data query processing policy and generating a response message for feedback comprises:
    generating a response message including the target data for feedback based on the target data when the data query processing policy corresponding to the data query request is a data pass-through policy.

4. The method of claim 1, characterized in that processing the target data by invoking the data query processing policy and generating a response message for feedback comprises:
    generating a response message characterizing that the data query request is not allowed for feedback when the data query processing policy corresponding to the data query request is a data isolation policy.

5. The method of claim 1, characterized in that
    determining the data query processing policy corresponding to the data query request by invoking the data access security model based on the business data access capability attribute of the first user, the first business security attribute of the target data and the second business security attribute of the query keyword comprises:
    when the business data access capability attribute of the first user identifies that the first user is of a type of limited data access right, the first business security attribute of the target data identifies that the target data is non-public, and the second business security attribute of the query keyword identifies that the keyword is public, invoking the data access security model to determine that the data query processing policy corresponding to the data query request is a data isolation policy, the data isolation policy being used to prevent the first user from querying the target data.

6. The method of claim 1, characterized in that processing the target data by invoking the data query processing policy and generating the response message for feedback comprises:
    processing the target data by invoking the data query processing policy and generating a response message, and configuring an effective time for specified data in the target data included in the response message and feeding back the response message, the effective time being used to indicate a validity period for use of the specified data in business.

7. The method of claim 1, wherein each of the first business security attribute and the second business security attribute comprises or indicates one or more of a public level, an identifiability level, and a time level of the data.

8. An electronic device, comprising:
    a memory and a processor;
    wherein the memory is used to store one or more computer instructions which are executed by the processor to
    receive a data query request characterizing that a first user requests target data using a query keyword;
    obtain a business data access capability attribute corresponding to the first user and obtaining a first business security attribute corresponding to the target data and a second business security attribute corresponding to the query keyword, wherein the business data access capability attribute is used to characterize capability of accessing data in a business environment in the charge of a user based on a business attribute of the user, and each of the first business security attribute and the second business security attribute is used to characterize an identification attribute for classifying data based on business security requirements, and comprises one or more of a public level, an identifiability level, and a time level of data, and wherein the public level indicates a degree of difficulty in obtaining the data, the identifiability level indicates whether the data can identify a user, a natural person, or an entity, and the time level indicates whether the association between user data and a user will become invalid within a threshold time period;

determine a data query processing policy corresponding to the data query request by invoking a data access security model based on the business data access capability attribute of the first user, the first business security attribute of the target data and the second business security attribute of the query keyword; and process the target data by invoking the data query processing policy and generating a response message for feedback.

9. A computer program product comprising computer readable storage medium storing one or more computer instructions thereon which are executed by a processor to receive a data query request characterizing that a first user requests target data using a query keyword;

obtain a business data access capability attribute corresponding to the first user and obtaining a first business security attribute corresponding to the target data and a second business security attribute corresponding to the query keyword, wherein the business data access capability attribute is used to characterize capability of accessing data in a business environment in the charge of a user based on a business attribute of the user, and each of the first business security attribute and the second business security attribute is used to characterize an identification attribute for classifying data based on business security requirements, and comprises one or more of a public level, an identifiability level, and a time level of data, and wherein the public level indicates a degree of difficulty in obtaining the data, the identifiability level indicates whether the data can identify a user, a natural person, or an entity, and the time level indicates whether the association between user data and a user will become invalid within a threshold time period;

determine a data query processing policy corresponding to the data query request by invoking a data access security model based on the business data access capability attribute of the first user, the first business security attribute of the target data and the second business security attribute of the query keyword; and process the target data by invoking the data query processing policy and generating a response message for feedback.

\* \* \* \* \*